(12) United States Patent
Rantala et al.

(10) Patent No.: US 9,326,492 B2
(45) Date of Patent: May 3, 2016

(54) DEVICE FOR CLEANING AQUARIUMS

(76) Inventors: Seppo J. Rantala, Chesterland, OH (US); Raymond Robert Wellman, Sarasota, FL (US)

( * ) Notice: Subject to any disclaimer, the term of this patent is extended or adjusted under 35 U.S.C. 154(b) by 1032 days.

(21) Appl. No.: 13/465,442

(22) Filed: May 7, 2012

(65) Prior Publication Data
US 2012/0279532 A1 Nov. 8, 2012

Related U.S. Application Data

(60) Provisional application No. 61/483,252, filed on May 6, 2011.

(51) Int. Cl.
*A01K 61/00* (2006.01)
*A01K 63/00* (2006.01)
*B08B 3/02* (2006.01)

(52) U.S. Cl.
CPC ............. *A01K 61/003* (2013.01); *A01K 63/006* (2013.01); *B08B 3/02* (2013.01)

(58) Field of Classification Search
CPC .. A01K 61/003; A01K 63/006; B05B 1/3033; B05B 1/326; B05B 3/025; B05B 3/027; B05B 1/32; B05B 3/021
See application file for complete search history.

(56) References Cited

U.S. PATENT DOCUMENTS

| 282,801 | A | | 3/1958 | Lambertson |
| 4,078,727 | A | * | 3/1978 | Lingnau ................ B05B 15/066 134/179 |
| 4,094,031 | A | | 6/1978 | Cellini |
| 4,552,515 | A | | 11/1985 | Endo |
| 4,589,982 | A | | 5/1986 | Willinger |
| 4,725,353 | A | | 2/1988 | Whitman |
| 5,094,591 | A | | 3/1992 | Whitley, II et al. |
| 5,135,647 | A | | 8/1992 | Childers |
| 5,542,142 | A | | 8/1996 | Young |
| 6,019,891 | A | | 2/2000 | Stoner |
| 6,447,261 | B1 | | 9/2002 | McCook |
| 6,749,134 | B2 | * | 6/2004 | Arenson et al. ................ 239/393 |
| 7,178,188 | B1 | | 2/2007 | Jaakola |
| 2007/0017558 | A1 | | 1/2007 | Walton |
| 2007/0289907 | A1 | | 12/2007 | VanHulzen |

OTHER PUBLICATIONS

Waterbuster Portable Power Pump, Attwood Corporation, Sep. 2004.

* cited by examiner

*Primary Examiner* — Jason Ko
*Assistant Examiner* — Spencer Bell
(74) *Attorney, Agent, or Firm* — Pearne & Gordon LLP

(57) ABSTRACT

A cleaning device for aquariums comprises a water-tight enclosure configured to be submerged under water and a water pump comprising an inlet for receiving water and an outlet pipe for expelling water. The outlet pipe comprises a central axis. A power source is disposed within the water-tight enclosure for powering the water pump. An adjustable nozzle comprises a nozzle outlet in fluid communication with the outlet pipe, and the adjustable nozzle is configured to be rotated about the central axis of the outlet pipe to selectively adjust a position of the nozzle outlet. In one example, water volume flow or water velocity flow expelled from the nozzle outlet can be selectively adjusted via rotational adjustment of the adjustable nozzle relative to the outlet pipe.

6 Claims, 4 Drawing Sheets

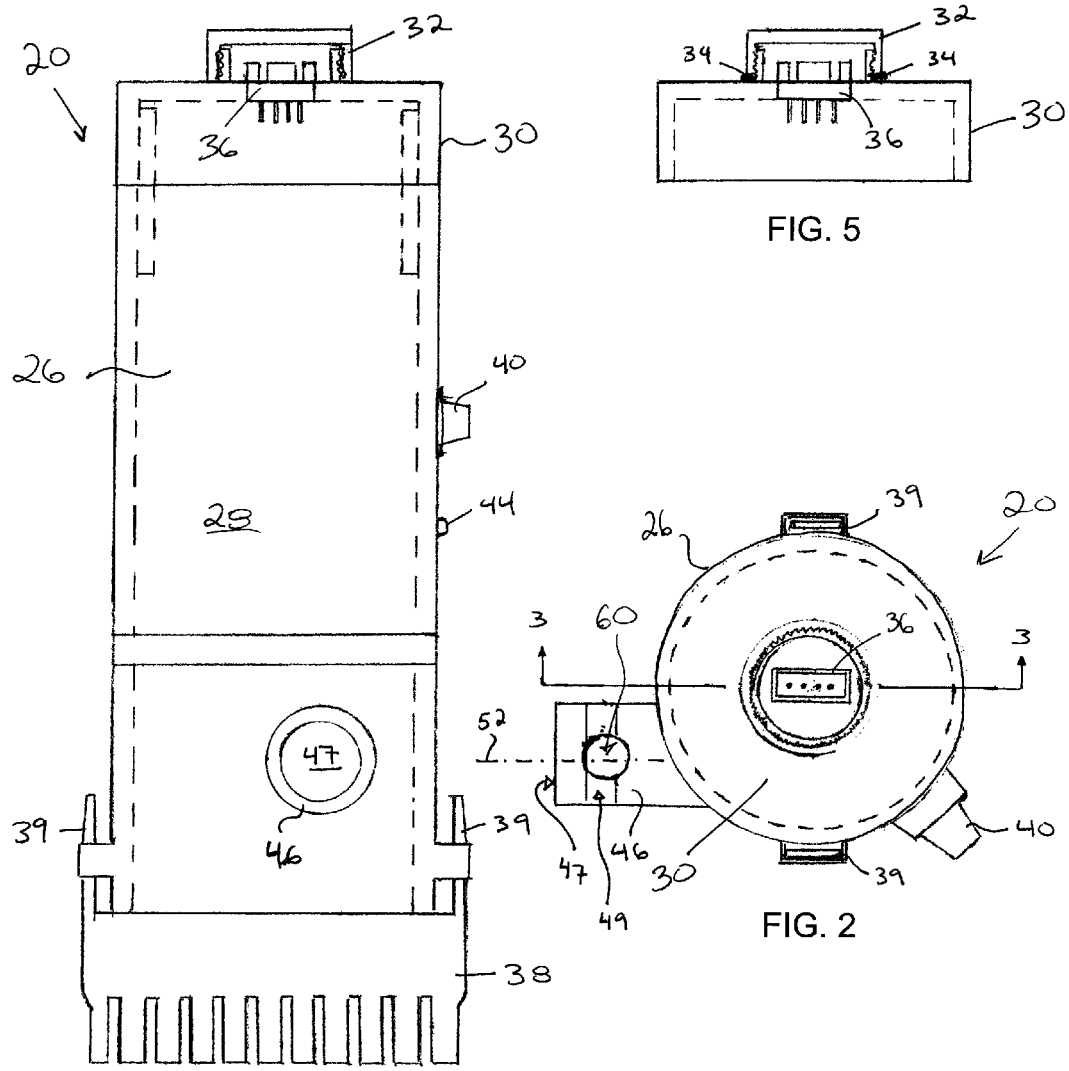

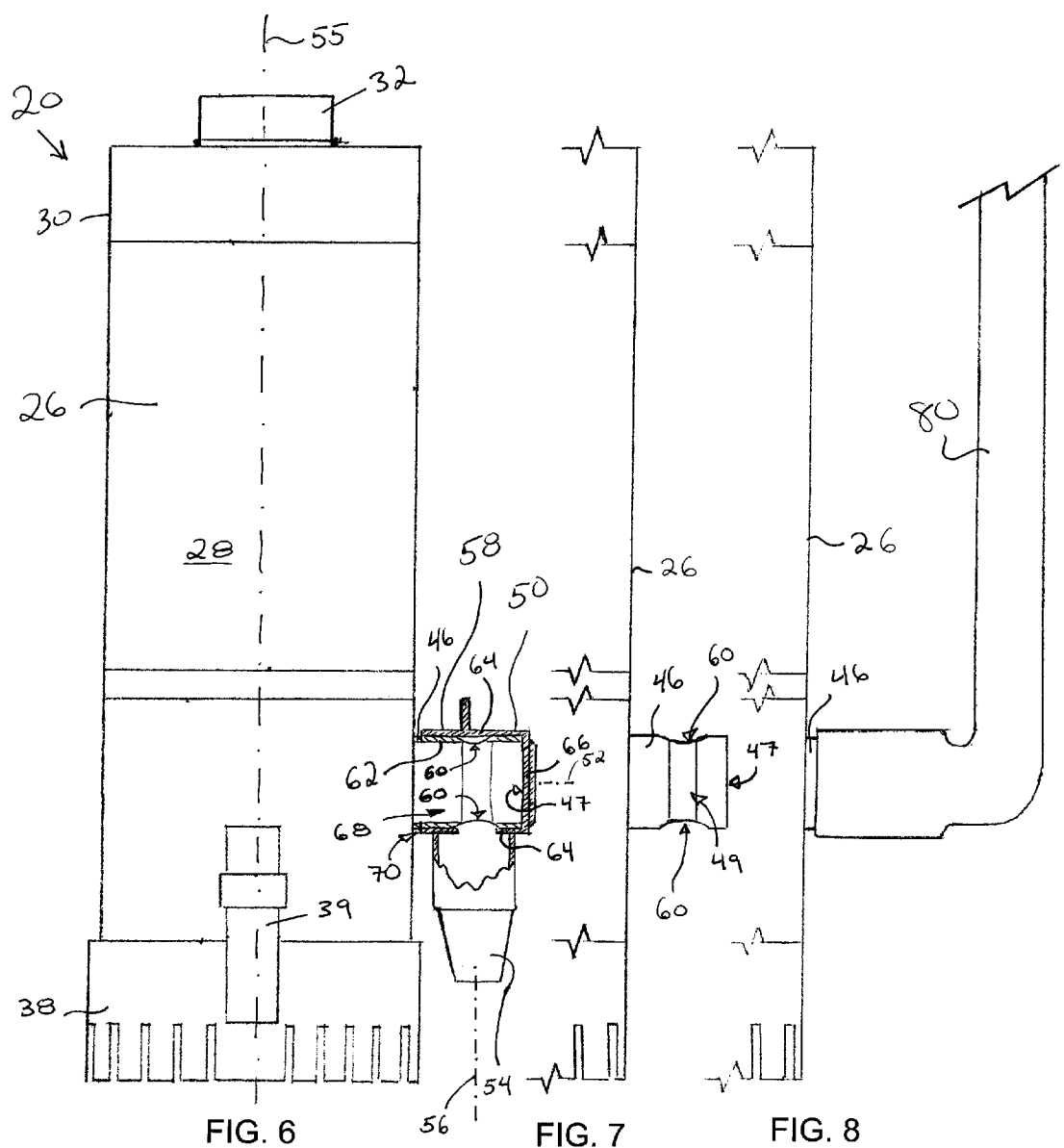

DEVICE FOR CLEANING AQUARIUMS

CROSS-REFERENCE TO RELATED APPLICATIONS

This application claims the benefit of U.S. Provisional Application No. 61/483,252, filed May 6, 2011, the entire disclosure of which is hereby incorporated herein by reference.

FIELD OF THE INVENTION

The present invention relates generally to a device to clean and blow off detritus and sediment from live coral, plants, and structures in marine saltwater aquariums.

BACKGROUND OF THE INVENTION

A common problem for owners of aquariums, especially marine saltwater aquariums, is that detritus and sediment collects on the live coral, plants, and structures. This can inhibit coral growth and/or cause disease. Conventional water circulation systems and filters are not sufficient to maintain the live coral in a sufficiently clean condition. Conventionally, aquariums have been cleaned manually using a hand-operated device similar to a turkey baster.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a cleaning device for aquariums comprises a water-tight enclosure configured to be submerged under water and a water pump at least partially disposed within the water-tight enclosure. The water pump comprises an inlet for receiving water and an outlet pipe for expelling water, wherein the outlet pipe comprises a central axis. A power source is disposed within the water-tight enclosure for powering the water pump. An adjustable nozzle comprises a nozzle outlet in fluid communication with the outlet pipe, wherein the adjustable nozzle is configured to be rotated about the central axis of the outlet pipe to selectively adjust a position of the nozzle outlet.

In accordance with another aspect of the present invention, a cleaning device for aquariums comprises a water-tight enclosure configured to be submerged under water. A water pump comprises an inlet for receiving water and an outlet pipe for expelling water, wherein the outlet pipe comprises a central axis and at least one hole extending through a sidewall of the outlet pipe. A power source is disposed within the water-tight enclosure for powering the water pump. An adjustable nozzle comprises an interior wall and a nozzle outlet in fluid communication with the outlet pipe. The adjustable nozzle is configured to be rotated about the central axis of the outlet pipe to selectively adjust a position of the nozzle outlet. Water volume flow or water velocity flow expelled from the nozzle outlet is selectively adjusted by selectively covering or uncovering the at least one hole with the interior wall via rotation of the adjustable nozzle relative to the outlet pipe.

In accordance with another aspect of the present invention, a cleaning device for aquariums comprises a water-tight enclosure configured to be submerged under water. A water pump comprises an inlet for receiving water and an outlet pipe for expelling water, wherein the outlet pipe comprises a top opening, a central axis and at least one hole extending through a sidewall of the outlet pipe. A power source is disposed entirely within the water-tight enclosure for powering the water pump. An adjustable nozzle comprises an interior wall, a top wall, and a nozzle outlet in fluid communication with the outlet pipe and configured to be rotated about the central axis of the outlet pipe to selectively adjust a position of the nozzle outlet. The top wall of the adjustable nozzle is arranged to generally seal and close off the top opening of the outlet pipe such that the water is forced to be discharged through the at least one hole in the sidewall of the outlet pipe. Water volume flow or water velocity flow expelled from the nozzle outlet is selectively adjusted by selectively covering or uncovering the at least one hole with the interior wall via rotation of the adjustable nozzle relative to the outlet pipe.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention.

BRIEF DESCRIPTION OF THE DRAWINGS

The foregoing and other aspects of the present invention will become apparent to those skilled in the art to which the present invention relates upon reading the following description with reference to the accompanying drawings, in which:

FIG. 2 is a top view of the cleaning device of FIG. 1;

FIG. 4 is a left view of the cleaning device of FIG. 1;

FIG. 5 is a side view of a water tight non-removable cap that forms an end of the example cleaning device of FIG. 1;

FIG. 6 is a rear view of the cleaning device of FIG. 1;

FIG. 7 is similar to FIG. 6, but shows an outlet pipe without a nozzle thereon;

FIG. 8 is similar to FIG. 6, but shows an alternative extension hose coupled to the outlet pipe.

DESCRIPTION OF EXAMPLE EMBODIMENTS

Figure 1:
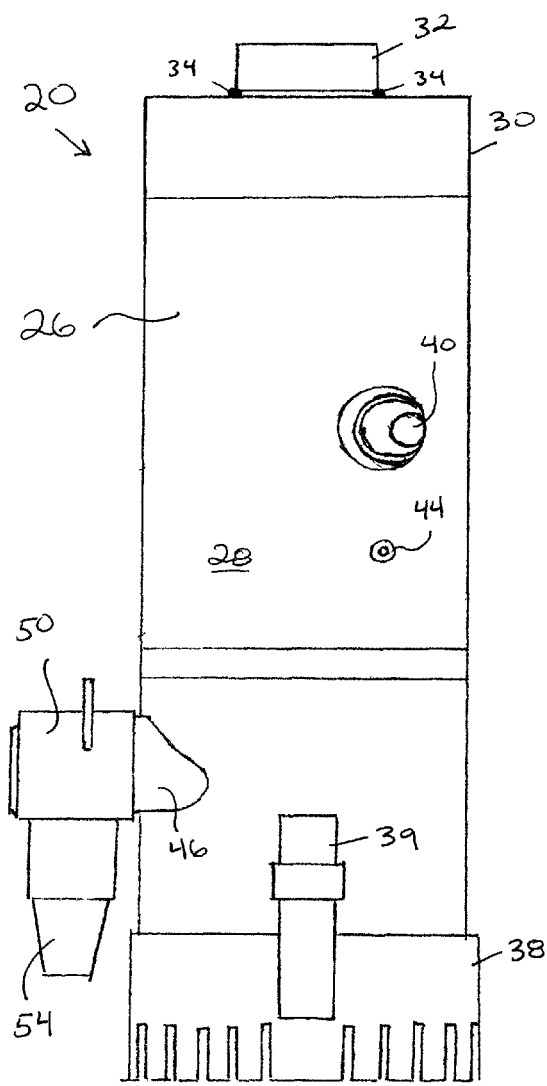
FIG. 1 is a front view of an example cleaning device.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Turning to FIGS. 1-2, an example of a cleaning device 20 is shown. The cleaning device 20 is used to clean and blow off detritus and sediment from live coral, plants, and structures in marine saltwater and freshwater aquariums. The cleaning device 20 helps stimulate and maintain coral growth in coral reef aquariums by keeping the aquarium cleaner than the filters and internal power heads (conventionally used for water movement) just cannot do alone. Conventional aquarium technology cannot provide enough water flow in the aquarium that Mother Nature provides in the natural reefs around the world.

Generally, the cleaning device 20 is a self-contained device that includes a submersible water pump 22 and self-contained power supply, such as a battery 24. In one example, the submersible water pump 22 can be similar to a 500 gallon per hour, 12 volt bilge pump (with or without a float switch), though various types of water pumps can be used. The output capacity the cleaning device 20 may be varied by changing the size or output capacity of the water pump 22. It is highly preferable that the submersible water pump 22 be capable of DC electrical operation for use with portable batteries, such as rechargeable batteries. Various kinds of batteries can be used with different voltages and capacities, such as NiCd, NiMh, or Lithium-based (e.g., LiPo, LiFe, etc.) batteries. Multiple batteries can be used in parallel, series, etc. In the shown example, the battery 24 is an 11.1 volt DC battery.

Figure 3:
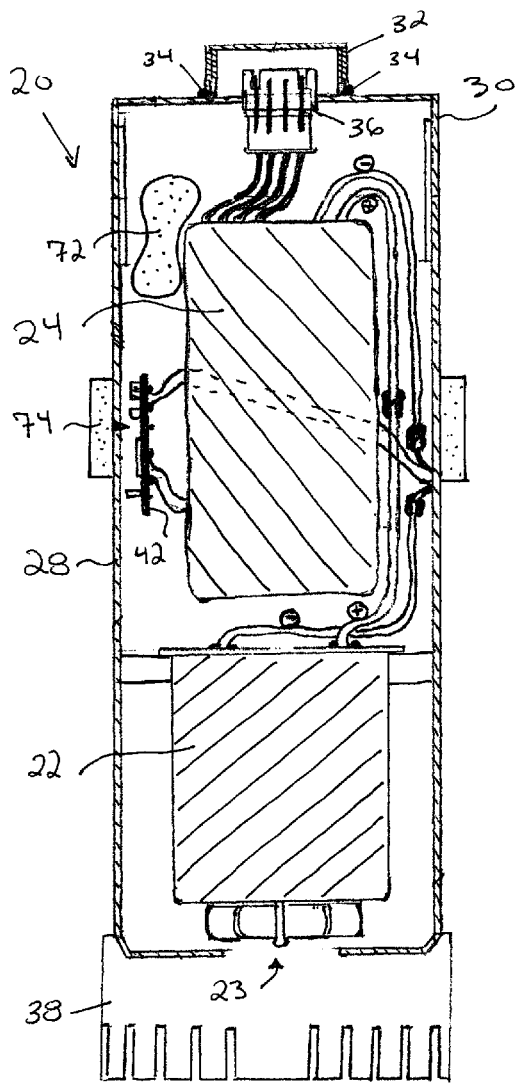
FIG. 3 is a sectional view taken through line 3-3 of FIG. 2.

Turning to FIGS. 3-5, the submersible water pump 22 is disposed at one end of a water tight enclosure 26. In one example, a body 28 of the water tight enclosure 26 is approximately a 2.25 inch diameter cylinder that is approximately 7.25 inches long inch with a water tight non-removable cap 30 disposed at one end of the water tight enclosure 26. The body 28 of the water tight enclosure 26 can be manufactured of various generally rigid materials that are water-resistant when submerged (e.g., plastic, metal, rubber, etc.) and can have various geometries, such as a circle, square, hexagon, octagon, polygon, etc. An extended removable screw-type cap 32 with a water tight o-ring 34 or the like to provide a removable water tight seal. The screw-type cap 32 can have various sizes, such as approximately 1 inch diameter and a height of approximately 0.375 inches. The body 28 of the water tight enclosure 26 contains storage space for a rechargeable battery 24, and the screw-type cap 32 is removable to provide access to a watertight electrical jack 36 used to recharge the batteries 24 without opening the water tight enclosure 26. As shown in FIG. 2, the screw-type cap 32 has been removed to provide access to the watertight electrical jack 36. As shown in FIG. 3, the battery 24 can be disposed entirely within the water-tight enclosure 26.

Optionally, the water pump 22 can have a removable (or even non-removable) protective screen 38 that can be periodically cleaned. In one example, the protective screen 38 can be disposed generally about the inlet 23 of the water pump 22, and can be removably coupled about the end of the body 28 of the water tight enclosure 26 by one or more resilient arms 39, a threaded coupler, etc. Of course, the water tight enclosure can have various sizes and geometries, depending upon the desired features and/or form factor.

The water tight enclosure 26 further contains storage space for an on/off water tight switch 40, and additional space for wiring, miscellaneous connectors, the charging plug, and/or foam insulation. The self-contained on/off switch 40 is used to manually operate the pump motor. In addition or alternatively, a motor "pulse" button can be provided for selectively operating the motor for short periods of time, and/or a motor speed selector can also be provided. In one example, the on/off switch 40 can be a "pulse" button type, whereby the pump 22 operates only when the user engages the on/off switch 40.

The water tight enclosure 26 also contains storage space for a microcontroller 42 or circuit board to indicate on/off status, battery charge, control battery recharging, etc. In one example, the microcontroller 42 is configured to detect a lower battery voltage condition, and activate a low battery signal with a visual display, such as an LED light 44, and/or other visual or audio indicator to notify the user of a low battery voltage condition. The microcontroller 42 could be programmed to illuminate the LED 44 to various colors to indicate the battery voltage over time, or could be programmed to only illuminate the LED 44 when a low battery condition is sensed. The LED 44 could be illuminated in various manners, such as different intensities, duty cycles (e.g., static or flashing), patterns, etc. The low voltage alarm could, in various examples, sound an alarm like a buzzer, bell, ring tone, etc.

The pump 22 further comprises an outlet pipe 46. Water is drawn into the inlet 23 of the pump 22, and is expelled from the outlet pipe 46 onto the live rock within the aquarium. The outlet pipe 46 of the pump 22 is extended and routed to provide a suitable outflow that can be easily directed towards a desired area within the aquarium. In one example, the cleaning device 20 is provided with an adjustable nozzle 50 in fluid communication with the outlet pipe 46 that can provide an easy adjustment of the water outflow direction. In one example, the outlet pipe 46 can have a central axis 52 arranged generally perpendicular to a longitudinal axis 55 of the body 28 of the water tight enclosure 26 (although various other axes are contemplated). The adjustable nozzle 50 can include a nozzle outlet 54 that is arranged at an angle relative to the central axis 52 of the outlet pipe 46. Preferably, the adjustable nozzle 50 is made of a flexible rubber-type material that easily but snugly fits over the outlet pipe 46, which may be made of a generally rigid material.

Figure 9:
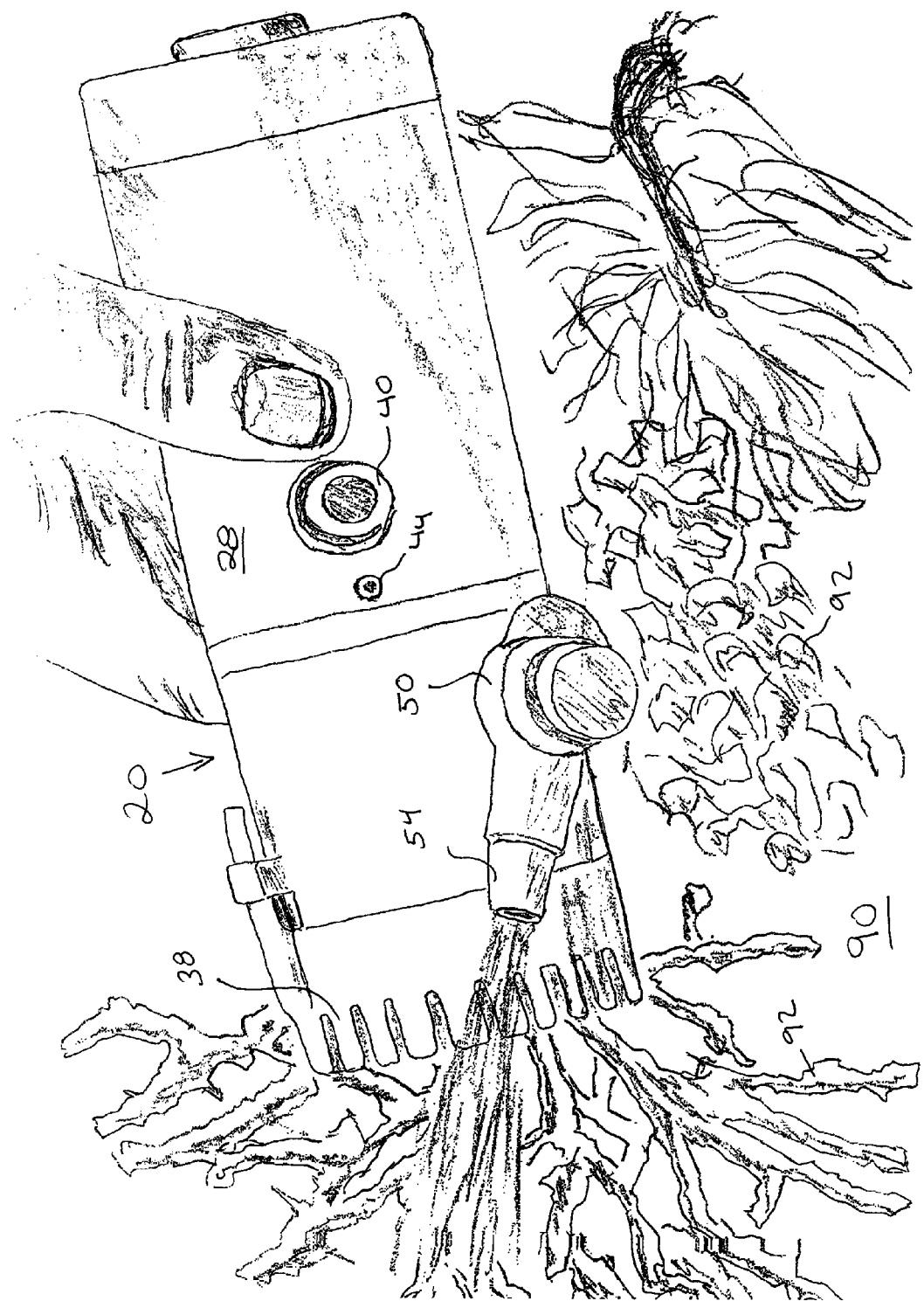
FIG. 9 illustrates an example use of the cleaning device within an aquarium.

In one example, as shown in FIGS. 6-7, the nozzle outlet 54 can have a nozzle axis 56 arranged generally parallel to the longitudinal axis 55 of the body 28 of the water tight enclosure 26 and thus generally perpendicular to the central axis 52 of the outlet pipe 46. As a result, the adjustable nozzle 50 is configured to be rotated about the central axis 52 of the outlet pipe to selectively adjust the position of the nozzle outlet 54 to direct the water outflow towards a desired area within the aquarium. The adjustable nozzle 50 can be rotated a full 360 degrees about the central axis 52, or other limited amount as desired. Turning briefly to FIG. 9, one example is illustrated where the cleaning device 20 provides access to cleaning areas of the aquarium 90 otherwise difficult to get to. By enabling adjustment of the nozzle outlet 54, the nozzle outlet 54 is rotated at an angle relative to the longitudinal axis 55 of the body 28 of the cleaning device 20 blow off detritus and sediment from live coral 92. In addition or alternatively, the nozzle outlet 54 can further be arranged at a static angle or adjustable angle relative to a base 58 of the adjustable nozzle 50 to provide additional adjustment of the water outflow direction.

In addition or alternatively, the effective cross-sectional geometry of the water outlet pipe can be increased or decreased, such as through the adjustable nozzle 50 or the like, to provide a desired water volume flow or water velocity flow. For example, different removable nozzles 50 having different nozzle outlet 54 profiles/cross-sectional areas can be used to provide the desired water volume flow or water velocity flow. As shown, the nozzle outlet 54 can generally taper towards a reduced cross-sectional geometry.

In addition or alternatively, the desired water volume flow or water velocity flow can be selectively adjusted via adjustment of the adjustable nozzle 50 relative to the outlet pipe 46.

For example, at least one hole 60 can extend through the sidewall 62 of the outlet pipe 46. As shown in FIGS. 2 and 7, the at least one hole 60 can be arranged generally perpendicular to the central axis 52 of the outlet pipe 46. Two or more holes 60 can be provided in the outlet pipe 46 to permit greater adjustment of the expelled water flow and direction, such as a pair of holes 60 arranged generally coaxial (e.g., 180 degrees apart). Of course, three or more holes could be arranged variously about the sidewall of the outlet pipe as desired to control the direction and/or pressure of the water flow. The hole(s) can have various shapes and sizes, such as a generally circular 5/16 inch diameter hole. As shown in FIG. 7, the outlet pipe 46 may also include a recessed channel 49 extending at least partially, such as entirely, around the periphery thereof to provide a water channel for fluid communication between the holes 60 when the adjustable nozzle 50 is received over the outlet pipe 46. In addition or alternatively, the interior of the adjustable nozzle 50 may include a detent or the like that corresponds to and lockingly engages the recessed channel 49 (or even another corresponding structure) to inhibit inadvertent removal of the adjustable nozzle 50 during use.

Turning to the partial sectional view of FIG. 6, the base 58 of the adjustable nozzle 50 also includes an open bottom 70 for receiving a portion of the outlet pipe 46 when the adjustable nozzle 50 is installed thereon. The base 58 of the adjustable nozzle 50 further includes an interior wall 64 and a top wall 66 that define an enclosed chamber 68 when the adjustable nozzle 50 is received over the outlet pipe 46. The nozzle outlet 54 is in fluid communication with the enclosed chamber 68 via an opening in the interior wall 64.

The top wall 66 of the adjustable nozzle 50 is arranged to generally seal and close off the top opening 47 of the outlet pipe 46 such that the water is forced to be discharged through the one or more holes 60 in the sidewall 62 of the outlet pipe 46. Thus, when pumped water is expelled through the outlet pipe 46, the water is redirected to flow out of the one or more holes 60 of the outlet pipe 46 and out of the nozzle outlet 54 to be expelled into the aquarium 90. It can be desirable to have a relatively tight fit between the adjustable nozzle 50 and the outlet pipe 46 to minimize water leakage, and thus there may be little or even substantially no water flow into the enclosed chamber 68. Instead, the water flows through the interior wall 64 and out of the nozzle outlet 54. Still, water may flow between the holes 60 in the water channel provided by the recessed channel 49 and/or in the enclosed chamber 68 so that at least a minimum amount of water flow is expelled from nozzle outlet 54 when the adjustable nozzle 50 is rotated relative to the outlet pipe 46.

As noted above, the desired water volume flow or water velocity flow of the pumped water discharged from the nozzle outlet 54 can be manually adjusted (e.g., increased or decreased) by rotating of the adjustable nozzle 50 relative to the outlet pipe 46. In one example, the adjustable nozzle 50 can be rotated about the central axis 52 and relative to the outlet pipe 46 to relatively increase or decrease the water volume flow or water velocity flow expelled from the nozzle outlet 54. Because the top wall 66 of the base 58 of the adjustable nozzle 50 effectively closes the opening 47 of the outlet pipe 46, the expelled water is discharged out of the holes 60 via the nozzle outlet 54. The water volume flow or water velocity flow of the pumped water discharged from the nozzle outlet 54 can be relatively increased by aligning at least one hole 60 with the nozzle outlet 54 such that the hole 60 is relatively uncovered by the interior wall 64 of the adjustable nozzle 50. The interior wall 64 can have various openings therethrough that are in fluid communication with the nozzle outlet 54 that can be selectively aligned relative to the hole(s) 60 to perform the covering and uncovering of the hole(s) 60. In other words, a further increase in water volume flow or water velocity flow can be discharged out of the hole 60 when substantially all of the cross-sectional area of the hole 60 is uncovered by the interior wall 64 of the adjustable nozzle 50. Similarly, a relative maximum water volume flow or water velocity flow can be discharged out of the adjustable nozzle 50 when the hole 60 is substantially uncovered by the interior wall 64 and the hole 60 is generally coaxial with the nozzle axis 56 of the nozzle outlet 54.

Conversely, the water volume flow or water velocity flow can be relatively decreased by reducing the cross-sectional area of the hole 60 by rotating the rotating of the adjustable nozzle 50 relative to the outlet pipe 46 to thereby cover at least a portion of the hole 60 using the interior wall 64 of the adjustable nozzle 50. A relative minimum water volume flow or water velocity flow can be discharged out of the hole 60 when substantially the entire cross-sectional area of the hole 60 is covered and obscured by the interior wall 64. Still, water may flow between the holes 60 in the water channel provided by the recessed channel 49 and/or within the enclosed chamber 68 so that at least a minimum amount of water flow is expelled from nozzle outlet 54. Alternatively, no recessed channel 49 or enclosed chamber 68 may be provided such that water discharge from the holes 60 is substantially blocked when substantially the entire cross-sectional area of all of the holes 60 is covered and obscured by the interior wall 64.

In such a manner, selectively covering or uncovering the hole 60 with the interior wall 64 via rotation of the adjustable nozzle 50 causes the interaction of the interior wall 64 and the hole 60 to act similar to an adjustable valve relative to the expelled water. This procedure provides a selective adjustability to the desired water volume flow or water velocity flow along with a desired direction of flow to clean the marine aquarium. For example, as shown in FIG. 6, one hole 60 (as illustrated, the upper hole 60) is substantially covered by the interior wall 64, while another hole 60 (as illustrated, the lower hole 60) is substantially uncovered by the interior wall 64. Indicia or the like can be provided on the adjustable nozzle 50, outlet pipe 46, and/or body 28 of the cleaning device 20 to indicate the expected water volume flow or water velocity flow at different orientations of the adjustable nozzle 50. The adjustable nozzle 50 may also include a handle or the like to facilitate adjustment thereof.

In addition or alternatively, the holes 60 through the sidewall 62 of the outlet pipe 46 could be replaced by one or more holes (not shown) extending through the top opening 47 of the outlet pipe 46. The top wall 66 of the adjustable nozzle 50 (and/or even a portion of the interior wall 64) could be designed to selectively cover or uncover the one or more holes (not shown) extending through the top opening 47 of the outlet pipe 46 to thereby adjust the water volume flow or water velocity flow, similar to that previously described herein. Such a top-mounted valve arrangement could be beneficial to provide a varied water flow along similar or even different rotational angles of the nozzle outlet 54 relative to the outlet pipe 46. In addition or alternatively, the water volume flow or water velocity flow could be controlled by selectively covering or uncovering the top opening 47 of the outlet pipe 46 (with or without the use of the holes 60) by raising and lowering the top wall 66 of the adjustable nozzle 50 relative to the top opening 47, such as by using a cam action or the like. In such an adjustment, the relative positioning of the top wall 66 relative to the top opening 47 would operate as a water valve. In addition or alternatively, the water volume flow or water velocity flow could be controlled by using an in-line valve, and/or selectively adjusting electrical operational output of the pump 22.

In addition or alternatively, the cleaning device 20 can utilize the adjustable nozzle 50 and/or nozzle outlet 54 as a convenient handle to control and maneuver the submerged cleaning device 20 underwater as it is being used during cleaning of the aquarium 90. Thus, at least a portion of the adjustable nozzle 50 and/or nozzle outlet 54 can sufficiently rigid to permit such handling. Still, a portion of the nozzle outlet 54 may be flexible to enable the user to clean hard-to-reach locations. In addition or alternatively, at least a portion of the nozzle outlet 54 can swivel relative to the body 28 of the water tight enclosure 26 to various angles, such as 45, 90, 180, 360 degrees, etc. A removable, flexible extension tube may also be used. In addition or alternatively, the adjustable nozzle 50 and/or nozzle outlet 54 can have hand grip structure.

Turning to FIG. 9, in operation the cleaning device 20 can be grasped by the body 28 water tight enclosure 26 (or even held by the outlet pipe 46) and submerged underwater in the aquarium 90. The exterior of the water tight enclosure 26 may include hand-grip structure or the like to facilitate gripping underwater, and preferably the hand-grip structure retains or even increases its tack underwater. The on/off switch 40 can then be turned on to operate the water pump 22. The user can direct the nozzle outlet 54 of the outlet pipe 46 towards coral to be cleaned so that the pumped water can gently sweep away the detritus and sediment from live coral, plants, and structures in the marine saltwater or freshwater aquarium 90. The cleaning device 20 can be easily controlled and maneuvered throughout the aquarium 90 to clean the desired surfaces. Finally, the water pump 22 can be deactivated via the on/off switch 40. Once the cleaning device 20 is removed from the water of the aquarium 90, the removable screw type cap 30 can be removed from the end of the water tight enclosure 26 to expose the charging jack 36, and a battery charger (not shown) can be connected to charge the batteries 24. The protective screen 38 covering the water inlet 23 of the pump 22 can also be removed, cleaned and/or replaced.

The cleaning device 20 may also include additional features. In one example, the cleaning device 20 can be designed to have desired buoyancy in fresh and/or salt water. For example, the cleaning device 20 can be configured to be positively buoyant. In one example, an amount of air space within the sealed water tight enclosure 26 can be chosen to provide desired buoyancy for the cleaning device. In addition or alternatively, the cleaning device 20 can utilize foam 72 or the like within the water tight enclosure 26 to provide the positive buoyancy. It can be beneficial to have the cleaning device 20 be slightly positively buoyant so that it tends to float and is easily retrieved from the aquarium 90. In still yet other examples, the cleaning device 20 can include at least one removable or non-removable buoyancy compensator 74 to increase (e.g., air or foam) or decrease (e.g., weights) the buoyancy to account for different types of water (fresh or salt), as well as local conditions or user preferences. The buoyancy compensator 74 can have different sizes, shapes, weights, etc. and/or multiple buoyancy compensators 74 (positively buoyant, negatively buoyant, or both) can be used together to provide the desired buoyancy. In one example, the buoyancy compensator 74 can include a removable foam ring or the like disposed on the exterior of the water tight enclosure 26, and can have a snug fit with the body 28 or could even mate with corresponding structure of the body 28, such as a recess, projection, etc. The buoyancy compensator 74 could include hand-grip structure or the like.

In addition or alternatively, the cleaning device 20 can be used for other purposes. In one example, the cleaning device 20 can be used for water change-outs. The water in a reef aquarium should be changed about 20 percent each month. This device will help in the aid of doing so by adding an optional extension hose to the outlet pipe and simply pumping water in and out of the tank. While described herein for use with an aquarium, it is understood that the device 20 can be used in various environments to move liquids from one location to another.

For example, as shown in FIG. 8, a removable flexible extension hose 80 may be attached to the outlet pipe 46 of the pump 22 after removing the adjustable nozzle 50 in order to pump water from or into the aquarium 90. For example, the cleaning device 20 can be partially inserted into the water of the aquarium 90 with the inlet 23 of the water pump 22 below the water line. As shown in FIG. 8, the optional extension hose 80 can be connected to the outlet pipe 46 and be used to direct the pumped water out of the aquarium 90 and towards a bucket, drain, or the like. It can be beneficial for the extension hose 80 to be at least partially flexible to facilitate directing water out of the aquarium 90 as local conditions permit. While it is shown that the removable flexible extension hose 80 may also be attached to the outlet pipe 46 of the pump 22 after removing the adjustable nozzle 50, it is also contemplated that the removable flexible extension hose 80 could be instead be connected to the adjustable nozzle 50 about the nozzle outlet 54. Such a construction could permit the manual adjustment of the water flow or velocity of the water being pumped into or out of the tank, as previously described above. Alternatively, an adjustable valve (not shown) or even a filter could be placed in-line with the flexible extension hose 80 to control and/or filter the outflow of water as desired. The cleaning device 20 can then be used to pump water back into the aquarium 90 by inserting the inlet 23 of the water pump 22 into the new water supply and placing the outlet of the extension hose 80 into the aquarium 90. It is further contemplated that the extension hose 80 could be configured to be rotated about the central axis of the outlet pipe to selectively adjust a position of the extension hose 80 and/or to selectively adjust water volume flow or water velocity flow expelled from the extension hose 80.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A cleaning device for aquariums, comprising:
a water-tight enclosure configured to be submerged under water;
a water pump comprising an inlet for receiving water and an outlet pipe for expelling water, wherein the outlet pipe comprises a central axis and at least two holes extending through a sidewall of the outlet pipe, and wherein said at least two holes are angularly displaced from each other about the central axis of the outlet pipe;
a power source disposed within the water-tight enclosure for powering the water pump; and
an adjustable nozzle comprising an interior wall surrounding the sidewall of the outlet pipe, the interior wall having a single opening coaxial with a nozzle outlet in fluid communication with the outlet pipe, wherein the adjustable nozzle is configured to be rotated about the central axis of the outlet pipe to selectively adjust a rotational position of the nozzle outlet with respect to the at least two holes of the outlet pipe, wherein a relative maximum water volume flow or water velocity flow is discharged out of the nozzle outlet of the adjustable nozzle when one of the at least two holes is arranged substantially coaxial with a nozzle axis of the nozzle outlet, wherein a relative minimum water volume flow or water velocity flow is discharged out of the nozzle outlet of the adjustable nozzle when the nozzle outlet is rotated to a position between the at least two holes such that substantially an entire cross-sectional area of both of the at least two holes is covered and obscured by the interior wall, and wherein water volume flow or water velocity flow expelled from the nozzle outlet is selectively increased or decreased to an intermediate amount, relative to the minimum and maximum, by rotating the nozzle outlet relative to the at least two holes of the outlet pipe to thereby selectively cover or uncover the cross-sectional area of the at least two holes with the interior wall.

2. The cleaning device of claim 1, wherein the adjustable nozzle further comprises a top wall arranged to generally seal and close off a top opening of the outlet pipe such that the water is forced to be discharged through the at least one hole in the sidewall of the outlet pipe.

3. A cleaning device for aquariums, comprising:
a water-tight enclosure configured to be submerged under water;
a water pump comprising an inlet for receiving water and an outlet pipe for expelling water, wherein the outlet pipe comprises a top opening, a central axis and at least one hole extending through a sidewall of the outlet pipe;
a power source disposed entirely within the water-tight enclosure for powering the water pump; and
an adjustable nozzle comprising an interior wall, a top wall, and a nozzle outlet in fluid communication with the outlet pipe and configured to be rotated about the central axis of the outlet pipe to selectively adjust a position of the nozzle outlet,
further comprising a circumferential channel disposed between a periphery of the outlet pipe and the interior wall of the adjustable nozzle, and in fluid communication with the at least one hole of the outlet pipe, wherein the top wall of the adjustable nozzle is arranged to generally seal and close off the top opening of the outlet pipe such that the water is forced to be discharged through the at least one hole in the sidewall of the outlet pipe, wherein water volume flow or water velocity flow expelled from the nozzle outlet is selectively increased or decreased by selectively covering or uncovering the at least one hole with the interior wall via rotation of the adjustable nozzle relative to the outlet pipe, and wherein a relative minimum, greater than zero, water volume flow or water velocity flow can be discharged out of the nozzle outlet via the at least one hole of the outlet pipe and the circumferential channel when substantially an entire cross-sectional area of said at least one hole is covered and obscured by the interior wall of the adjustable nozzle.

4. The cleaning device of claim 3, wherein water volume flow or water velocity flow of the water discharged from the nozzle outlet is relatively increased when the at least one hole is relatively uncovered by the interior wall of the adjustable nozzle.

5. The cleaning device of claim 4, wherein a relative maximum water volume flow or water velocity flow is discharged out of the adjustable nozzle when the at least one hole is arranged generally coaxial with a nozzle axis of the nozzle outlet.

6. The cleaning device of claim 3, further comprising a flexible extension hose configured to replace the adjustable nozzle and be removably coupled to the outlet pipe of the pump to direct pumped water to a desired distant location.

* * * * *